March 7, 1944.   D. B. LOVE   2,343,562
MOUSE TRAP
Filed Oct. 31, 1942
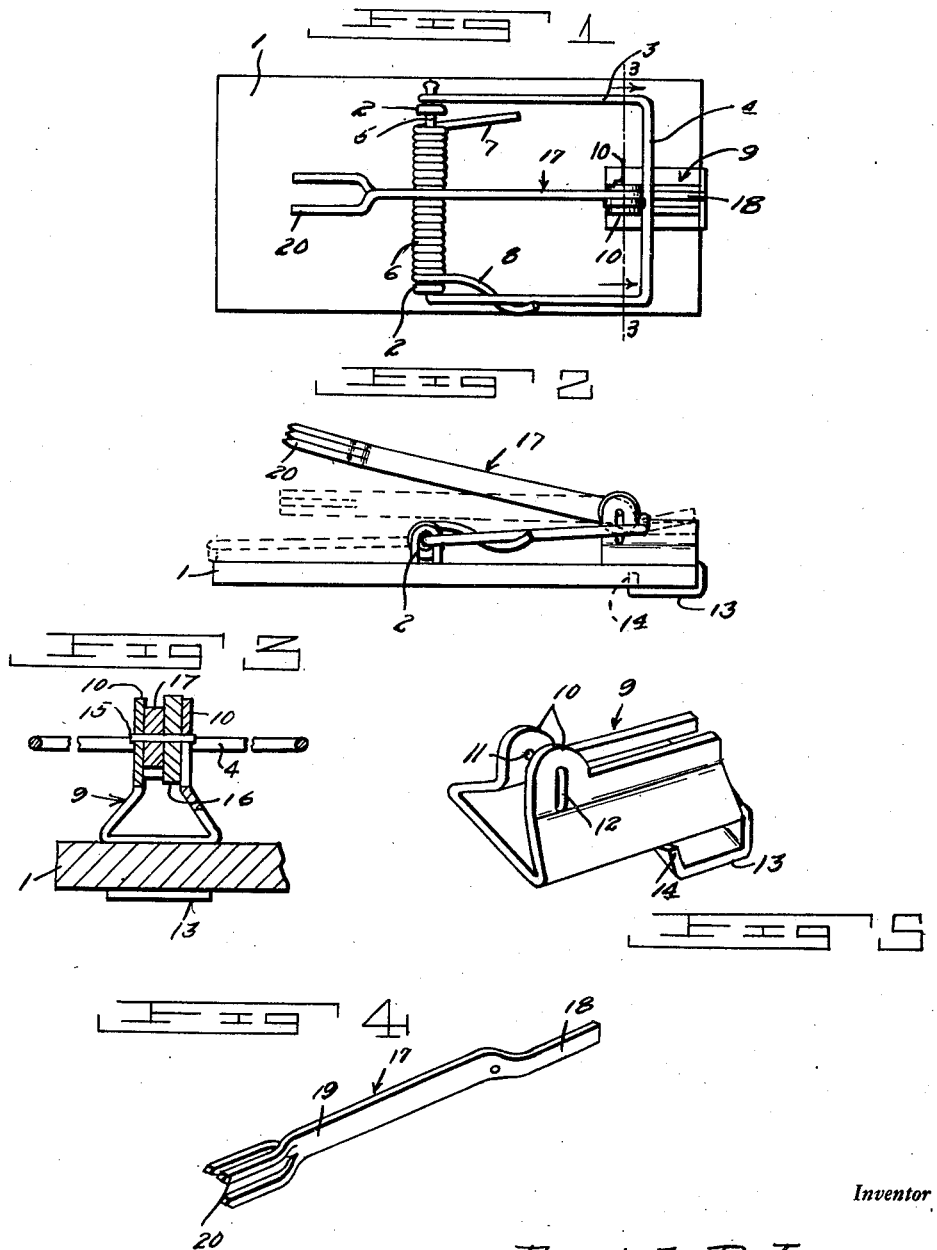
Inventor
Daniel B. Love
By Clarence A. O'Brien
and Harvey B. Jacobson
Attorney Patented Mar. 7, 1944

2,343,562

UNITED STATES PATENT OFFICE 2,343,562

MOUSETRAP

Daniel B. Love, Saratoga, Wyo.

Application October 31, 1942, Serial No. 464,057

2 Claims. (Cl. 43—83.5)

My invention relates to improvements in mouse traps of the so-called striker type in which a spring tensioned striker is set by means of a releasable latch, the principal object in view being to provide for such traps a simply constructed latch for setting the striker with a snap action easily and safely, and which is adapted for easy and quick release, will not get out of order nor jar loose.

Other and subordinate objects are also comprehended by my invention, all of which, together with the precise nature of my improvements, will be readily understood when the succeeding description and claims are read with reference to the drawing accompanying and forming part of this specification.

In said drawing:

Figure 1 is a view in top plan of a mouse trap equipped according to my invention, Figure 2 is a view in side elevation, Figure 3 is a view in transverse section taken on the line 3—3 of Figure 1 and drawn to an enlarged scale, Figure 4 is a view in perspective of the bait holder and trip, and Figure 5 is a view in perspective of the latch and trip mounting drawn to an enlarged scale.

Referring to the drawing by numerals, my improvements have been shown therein as embodied in a mose trap including an elongated rectangular base panel 1, of wood or the like, provided in the transverse center thereof with a pair of upstanding staples 2 arranged adjacent opposite sides of the base panel 1, respectively, and forming bearings for the striker 3. The striker 3 has the form of a rectangular rod-like frame including a free striking end 4 and an end 5 extended through said staples 2 so that said striker is pivotally mounted for vertical swinging of its striking end 4 from a set position adjacent one end of the panel 1 into an effective striking position adjacent the opposite end of said panel 1. The usual coil spring 6 is coiled around the end 5 of the striker 3 with one of its ends 7 bearing against the panel 1, and its other end 8 bearing against one side of the striker 3, and tensioning said striker for swinging in the manner described.

According to my invention, the base panel 1 is equipped at the end thereof toward which the striker 3 is set with a combined latch and trip mounting 9 having the form of an elongated channel member arranged lengthwise in the longitudinal center of said panel, open side uppermost, and provided at its inner end with a pair of opposed upstanding ears 10 spaced upon opposite sides of the longitudinal center of the trap and one having a round pintle receiving opening 11 therein, the other having a vertically extending slot 12. At its other end the member 9 is provided with an underlying clip 13 disposed against the under side of the panel 1 and having a toothed front end 14 embedded in said panel 1 whereby the member or mounting is fixed to said panel. The described mounting is made of resilient metal for a purpose presently seen.

A pintle 15 extends between the ears 10 parallel with the axis of the striker 3 and with one end fixed in the hole 11 of the one ear and the other end thereof extending into the slot 12 of said other ear. A latch forming disk 16 is rotatably mounted on the pintle 15 between the ears 10 to rotate concentrically on said pintle alongside of one of the ears 10. The latch disk 16 and ears 10 are so arranged that the striker 3 may be swung down into set position with its striking end 4 abutting the upper edges of the member 9 behind said ears 10 and disk 16. The latch disk 16 is so arranged crosswise of the striking end 4 of the striker 3 as to provide a peripheral point thereon in the horizontal center thereof furthest from the axis of the striker 3 and slightly outside the arc of movement of said end 4, whereby when the striker 3 is swung into set position, said end 4 will ride downwardly over the periphery of said disk to be flexed outwardly thereby and snap back under the horizontal center of said disk to be thus latched in set position in opposition to the coil spring 6. This snap action locking is facilitated by the disk 16, pintle 15, and ears 10 in which the pintle is fixed yieldingly so that the pintle 15 and disk 16 move downwardly slightly under pressure of the striking end 4 of the striker 3 on the disk, said pintle 15 and disk 16 swinging upwardly when said end 4 reaches set position.

As will be clear, the slot 12 provides for downward movement of the pintle 15 sufficient in degree for the operation described.

A lever-like trip 17 is pivoted adjacent one end thereof on the pintle 15 between the disk 16 and one ear 10 for vertical swinging movement and to provide a short trip arm 18 adapted to underlie the striking end 4 of the striker 3 in the set position of said striker, and a long arm 19 extending forwardly over the spring 6 and terminating in an impaling fork 20 for fastening bait thereto.

Obviously, when the long arm 19 of the trip 17 is pressed down by an animal nibbling on the bait, the short arm 18 acts to pry the striking end 4 of the striker 3 upwardly past the horizontal center of the latch disk 16 to thereby unlatch the striker. Since the arm 19 is pivoted on the pintle 15 and the pintle is free to flex downwardly in the slot 12 under prying action of said arm, the disk 16 will be moved downwardly and thereby assist in unlatching said striker. It will, of course, be understood that the striker 3 is sufficiently resilient to permit bending or flexing of the end 4 thereof so that it may pass downwardly over said latch disk 16 to permit the striker 3 to assume set position.

The foregoing will, it is believed, suffice to impart a clear understanding of my invention, since the operation has been set forth in connection with the description of parts.

Manifestly, the invention, as described, is susceptible of modification without departing from the inventive concept, and right is herein reserved to such modifications as fall within the scope of the appended claims.

What I claim is:

1. In a mouse trap including a base panel, and a tensioned settable striker having a flexible striking end disposed transverse to said panel and being pivotally mounted on said panel for swinging of said end downwardly into set position adjacent the panel, latching means for releasably retaining said striker in set position comprising a resilient pintle mounted on said panel to flex vertically, a disk rotatably mounted on said pintle to peripherally engage said end and flex the same just prior to swinging of said striker into set position whereby said end of the striker is permitted to pass said disk and the pintle is rendered reactive to move the disk upwardly to obstruct movement of said end from set position, and a trip acting to move said end out of set position.

2. In a mouse trap including a base panel, and a tensioned settable striker having a flexible striking end disposed transverse to said panel and being pivotally mounted on said panel for swinging of said end downwardly into set position adjacent the panel, latching means for releasably retaining said striker in set position comprising a resilient pintle mounted on said panel to flex vertically, a disk rotatably mounted on said pintle to peripherally engage said end and flex the same just prior to swinging of said striker into set position whereby said end of the striker is permitted to pass said disk and the pintle is rendered reactive to move the disk upwardly to obstruct movement of said end from set position, the mounting for said disk and pintle comprising a clip-like channel member straddling said panel, and a trip acting to move said end out of set position.

DANIEL B. LOVE.